United States Patent
Eisendle et al.

(10) Patent No.: US 11,409,970 B2
(45) Date of Patent: Aug. 9, 2022

(54) UWB COMMUNICATION DEVICE AND CORRESPONDING OPERATING METHOD

(71) Applicant: NXP B.V., Eindhoven (NL)

(72) Inventors: Christian Eisendle, Graz (AT); Ulrich Andreas Muehlmann, Graz (AT); Michael Schober, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/147,918

(22) Filed: Jan. 13, 2021

(65) Prior Publication Data
US 2021/0224492 A1  Jul. 22, 2021

(30) Foreign Application Priority Data
Jan. 17, 2020 (EP) .................................... 20152544

(51) Int. Cl.
*G08B 23/00* (2006.01)
*G06K 7/00* (2006.01)
*G06K 7/10* (2006.01)
*G06K 19/07* (2006.01)

(52) U.S. Cl.
CPC ....... *G06K 7/0008* (2013.01); *G06K 7/10306* (2013.01); *G06K 7/10316* (2013.01); *G06K 19/0723* (2013.01)

(58) Field of Classification Search
CPC ............. G06K 7/0008; G06K 7/10306; G06K 7/10316; G06K 19/0723
See application file for complete search history.

(56) References Cited

U.S. PATENT DOCUMENTS

| | | | | |
|---|---|---|---|---|
| 5,245,346 A * | 9/1993 | Nishimura | ............ | G01S 13/825 342/51 |
| 5,414,761 A * | 5/1995 | Darbee | ............... | H03J 1/0025 379/102.01 |
| 5,677,711 A * | 10/1997 | Kuo | ................... | G06F 3/03547 345/173 |
| 6,525,648 B1 * | 2/2003 | Kubler | ............... | G06K 19/0715 340/10.5 |
| 6,892,052 B2 * | 5/2005 | Kotola | ............... | G06Q 20/4014 455/66.1 |

(Continued)

OTHER PUBLICATIONS

Cruz et al., Hybrid UHF-UWB Antenna for Passive Indoor Identification and Localization Systems (Year: 2013).*

(Continued)

*Primary Examiner* — Quang Pham

(57) ABSTRACT

In accordance with a first aspect of the present disclosure, an ultra-wideband (UWB) communication device is provided, comprising: a UWB communication unit being configured to establish and perform UWB radio communication with an external device, a radio frequency (RF) communication device being a radio frequency identification (RFID) tag, wherein the RF communication device is configured to receive at least one command from an external reader and to initiate a wake-up or a power-up of the UWB communication unit in response to receiving said command. In accordance with a second aspect of the present disclosure, a corresponding method of operating an ultra-wideband (UWB) communication device is conceived.

19 Claims, 4 Drawing Sheets

(56) References Cited

U.S. PATENT DOCUMENTS

| | | | | |
|---|---|---|---|---|
| 7,072,697 | B2* | 7/2006 | Lappetelainen | H04W 52/0229 455/574 |
| 7,180,421 | B2 | 2/2007 | Pahlaven et al. | |
| 7,349,666 | B2* | 3/2008 | Yamamoto | H04B 1/40 709/228 |
| 7,529,536 | B2* | 5/2009 | Wang | H04W 52/028 455/343.1 |
| 7,561,541 | B2* | 7/2009 | Ferchland | H04W 52/0287 455/574 |
| 7,831,246 | B1* | 11/2010 | Smith | G06Q 20/3255 455/420 |
| 8,315,565 | B2 | 11/2012 | Twitchell, Jr. | |
| 9,983,662 | B2* | 5/2018 | Chang | G06F 3/00 |
| 10,609,643 | B1* | 3/2020 | Le | H04B 5/0031 |
| 2002/0085515 | A1* | 7/2002 | Jaynes | H04L 67/06 370/352 |
| 2003/0005136 | A1* | 1/2003 | Eun | G06Q 20/425 705/26.1 |
| 2003/0055792 | A1* | 3/2003 | Kinoshita | G06Q 20/20 705/67 |
| 2004/0063459 | A1* | 4/2004 | Yamashita | H04H 20/88 455/556.1 |
| 2004/0203352 | A1* | 10/2004 | Hall | G06K 7/0008 455/41.1 |
| 2004/0203851 | A1* | 10/2004 | Vetro | H04L 67/306 455/414.1 |
| 2004/0252030 | A1* | 12/2004 | Trimble | H04L 29/06 340/8.1 |
| 2005/0030160 | A1* | 2/2005 | Goren | G06K 19/07758 340/10.5 |
| 2005/0165916 | A1* | 7/2005 | Cromer | H04W 76/15 709/220 |
| 2006/0030353 | A1* | 2/2006 | Jun | H04W 52/0235 455/574 |
| 2006/0068750 | A1* | 3/2006 | Burr | H04W 52/0225 455/343.1 |
| 2006/0111046 | A1* | 5/2006 | Sugimoto | B60R 25/24 455/41.2 |
| 2006/0164212 | A1* | 7/2006 | Roz | G06K 7/10336 340/10.2 |
| 2007/0013235 | A1* | 1/2007 | Fein | G06F 21/81 307/116 |
| 2007/0022058 | A1* | 1/2007 | Labrou | G06Q 20/3272 705/67 |
| 2008/0012688 | A1* | 1/2008 | Ha | H04B 1/7176 375/138 |
| 2008/0048837 | A1* | 2/2008 | Montgomery | G06K 19/0716 235/375 |
| 2008/0143487 | A1* | 6/2008 | Hulvey | H04B 5/0062 340/10.34 |
| 2008/0174405 | A1* | 7/2008 | Toorn | H04M 1/72412 340/10.1 |
| 2010/0277283 | A1* | 11/2010 | Burkart | G06Q 10/00 340/10.3 |
| 2010/0277284 | A1* | 11/2010 | Brown | G06K 7/0008 340/10.3 |
| 2015/0323984 | A1* | 11/2015 | Ganton | G06F 1/28 713/323 |
| 2020/0100179 | A1* | 3/2020 | Zhou | H04W 72/042 |
| 2020/0112917 | A1* | 4/2020 | Nam | H04W 52/0241 |
| 2020/0143221 | A1* | 5/2020 | Kwang | G06K 19/07758 |
| 2020/0235950 | A1* | 7/2020 | Park | H04W 52/0216 |
| 2020/0288397 | A1* | 9/2020 | Ahn | H04W 80/02 |
| 2021/0195524 | A1* | 6/2021 | Ahn | H04W 52/0229 |

OTHER PUBLICATIONS

Fantuzzi et al., Simultaneous UHF energy harvesting and UWB-RFID communication (Year: 2016).*

Vizziello et al., Efficient RFID Tag Identification Exploiting Hybrid UHF-UWB Tags and Compressive Sensing (Year: 2016).*

Ziai et al., UWB-UHF RFID tag (Year: 2015).*

Lazaro et al., Active UWB Reflector for RFID and Wireless Sensor Networks (Year: 2013).*

Radiom et al., Far-Field On-Chip Antennas Monolithically Integrated in a Wireless-Powered 5.8-GHz Downlink/UWB Uplink RFID Tag in 0.18 mu Standard CMOS (Year: 2012).*

Arnitz, D. et al.; "UWB Ranging in Passive UHF RFID: Proof of Concept;" The Institution of Engineering and Technology; Electronics Letters; vol. 46, No. 20; Sep. 30, 2010; DOI: 10.1049/el.2010.1703.

Constanzo, Alessandra et al.; "Energy Autonomous UWB Localization;" IEEE Journal of Radio Frequency Identification; vol. 1, Issue. 3, Sep. 2017; DOI: 10.1109/JRFID.2018.2792538.

D'Errico, R. et al.; "An UWB-UHF Semi-Passive RFID System for Localization and Tracking Applications;" IEEE 2012 International Conference on RFID—Technologies and Applications (RFID—TA); Nov. 5-7, 2012; Nice, France; DOI: 10.1109/RFID-TA.2012.6404509.

Zheng, Li-Rong et al.; "Future RFID and Wireless Sensors for Ubiquitous Intelligence;" 2008 NORCHIP; Nov. 16-17, 2008; Tallinn, Estonia; DOI: 10.1109/NORCHP.2008.4738269.

* cited by examiner

UWB COMMUNICATION DEVICE AND CORRESPONDING OPERATING METHOD

CROSS-REFERENCE TO RELATED APPLICATIONS

This application claims priority under 35 U.S.C. § 119 to European Patent Application No. 20152544.1, filed on Jan. 17, 2020, the contents of which are incorporated by reference herein.

TECHNICAL FIELD

The present disclosure relates to an ultra-wideband (UWB) communication device. Furthermore, the present disclosure relates to a corresponding method of operating a UWB communication device.

BACKGROUND

Ultra-wideband (UWB) is a technology that uses a high signal bandwidth, in particular for transmitting digital data over a wide spectrum of frequency bands with very low power. For example, ultra-wide band technology may use the frequency spectrum of 3.1 to 10.6 GHz and may feature a high-frequency bandwidth of more than 500 MHz and very short pulse signals, resulting in high data rates. The UWB technology enables a high data throughput for communication devices and a high precision for localization devices. For this reason, localization systems often make use of UWB technology.

SUMMARY

In accordance with a first aspect of the present disclosure, an ultra-wideband (UWB) communication device is provided, comprising: a UWB communication unit being configured to establish and perform UWB radio communication with an external device, a radio frequency (RF) communication device being a radio frequency identification (RFID) tag, wherein the RF communication device is configured to receive at least one command from an external reader and to initiate a wake-up or a power-up of the UWB communication unit in response to receiving said command.

In one or more embodiments, the RFID tag is an ultra-high frequency (UHF) tag.

In one or more embodiments, the RF communication device is configured to initiate said wake-up by transmitting a wake-up signal to the UWB communication device.

In one or more embodiments, the UWB communication device further comprises a power management unit which is configured to provide power to the UWB communication unit, wherein the RF communication device is configured to initiate said power-up by transmitting a power-up signal to said power management unit.

In one or more embodiments, the UWB communication unit and the RF communication device are coupled to each other through a wired connection.

In one or more embodiments, the wake-up signal is stored in the RF communication device, and the UWB communication unit is configured to overwrite said wake-up signal after the wake-up has been performed.

In one or more embodiments, the UWB communication unit is configured to receive one or more functional commands from the RF communication device.

In one or more embodiments, the functional commands relate to ranging operations to be performed by the UWB communication unit.

In one or more embodiments, the functional commands comprise task scheduling commands.

In one or more embodiments, the UWB communication unit is configured to switch itself off after performing one or more predefined functions.

In one or more embodiments, a localization system comprises a UWB communication device of the kind set forth and said external reader.

In one or more embodiments, said external reader is configured to transmit one or more functional commands to the RF communication device.

In accordance with a second aspect of the present disclosure, a method of operating an ultra-wideband (UWB) communication device is conceived, comprising: receiving, by a radio frequency (RF) communication device comprised in the UWB communication device, at least one command from an external reader, wherein said RF communication device is a radio frequency identification (RFID) tag, initiating, by the RF communication device, a wake-up or a power-up of a UWB communication unit comprised in the UWB communication device in response to receiving said command, and establishing and performing, by the UWB communication unit, UWB radio communication with an external device.

DESCRIPTION OF DRAWINGS

Embodiments will be described in more detail with reference to the appended drawings, in which.

DESCRIPTION OF EMBODIMENTS

Ultra-wideband (UWB) is a technology that uses a high signal bandwidth, in particular for transmitting digital data over a wide spectrum of frequency bands with very low power. For example, ultra-wide band technology may use the frequency spectrum of 3.1 to 10.6 GHz and may feature a high-frequency bandwidth of more than 500 MHz and very short pulse signals, resulting in high data rates. The UWB technology enables a high data throughput for communication devices and a high precision for localization devices. For this reason, localization systems often make use of UWB technology.

Indoor localization systems typically consist of a stationary base station and one or more mobile UWB tags, whose position should be determined. The base station is often wired and connected to a supervising system. Therefore, the power consumption on the side of the base station is not critical. On the other hand, the power consumption on the tag side is important, because on the tag side the system has a very limited battery capacity. Present-day UWB tag systems designed for a low power consumption often have an additional low-power communication interface for out-of-band communication (i.e., for radio communication different from UWB) or a power-saving duty cycling ratio on the UWB tag side for keeping the radio frequency (RF) on-time as small as possible. If an additional active communication interface, e.g. Bluetooth Low Energy (BLE), is used, the total power consumption of the system equals the sum of the power consumption of the BLE interface and the UWB interface. In such systems, the UWB interface can be switched off most of the time in order to reduce the power consumption on the UWB side. If a UWB-only system is used, the power consumption of the additional communication interface can be saved, but the UWB interface needs to have a given duty cycling ratio for keeping the link to the base station open.

Figure 1:
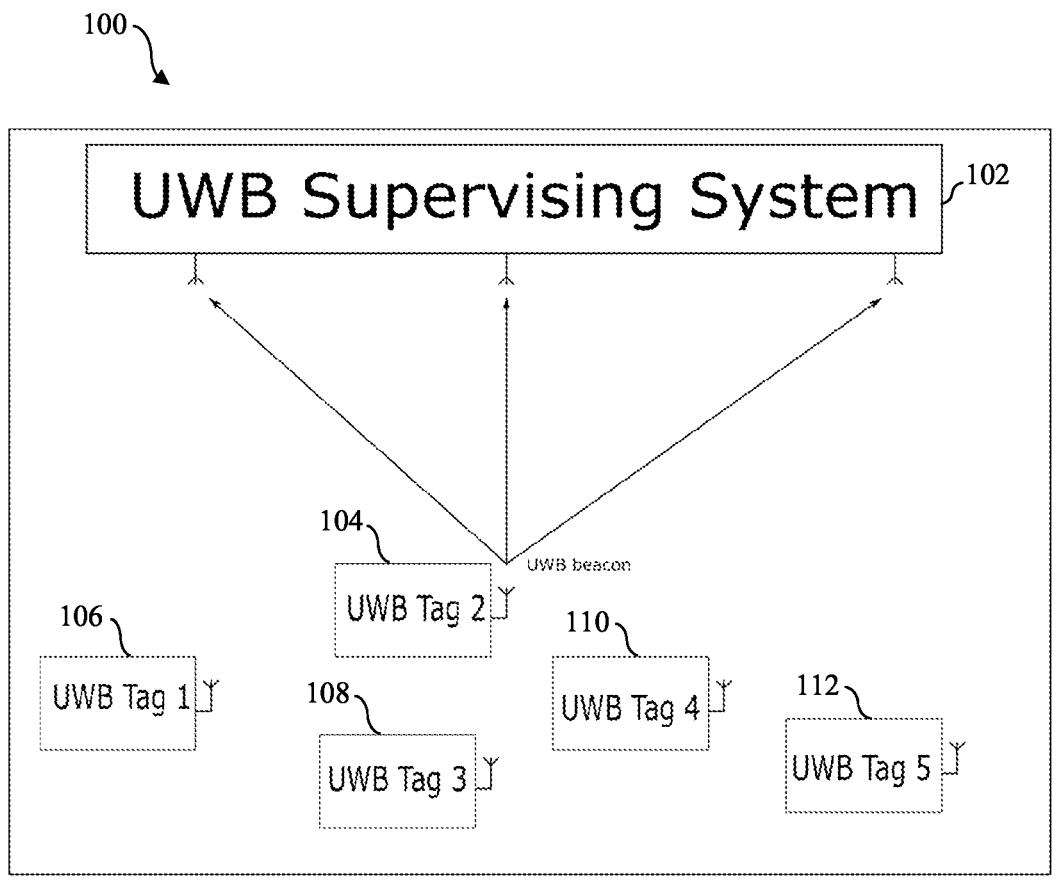
FIG. 1 shows an example of a localization system.

FIG. 1 shows an example of a localization system 100. The localization system 100 comprises a UWB supervising system 102 and a plurality of UWB tags 104, 106, 108, 110, 112, whose position should be determined. In particular, a UWB-only localization system is shown, i.e. a system without an additional, out-of-band communication interface. In this example, the UWB tags 104, 106, 108, 110, 112 are transmitting a beacon for informing the UWB supervising system 102 about their position. Depending on the implemented localization method, the tags are localized either by a simple beacon, or by an additional UWB frame sequence following the beacon. The tags in such a UWB-only system broadcast the beacons independently from each other, which means that no higher protocol for anti-collision can be applied. As a consequence, the maximum number of nodes is limited because of the collision likelihood.

In a UWB tag system that has a second active interface (not shown), e.g. BLE, the UWB tags can be woken up using a BLE command. This means that only the tag that needs to be woken up can be selected and that only this tag starts transmitting frames over the UWB interface. As a result, no collision can occur because all the other tags are either in a sleep mode or switched off. The disadvantage of such a system is that the additional communication interface consumes power, even if no UWB communication is needed. Even if the additional communication interface is duty-cycled and consumes much less power than the UWB interface, the average UWB sleep power consumption of the tag system will be increased significantly. Especially for systems having a small battery, in which the UWB interface is turned off most of the time, the additional power consumption of a second RF interface can consume most of the power of the UWB tag.

Now discussed are an ultra-wideband (UWB) communication device and a corresponding method of operating a UWB communication device, which facilitate reducing the power consumption and which facilitate increasing the number of UWB tags that can be used within a localization system of the kind set forth.

Figure 2:
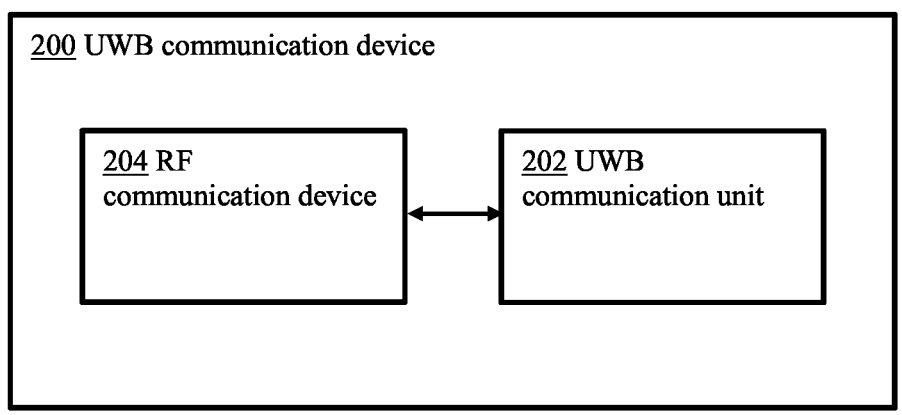
FIG. 2 shows an illustrative embodiment of a UWB communication device.

FIG. 2 shows an illustrative embodiment of a UWB communication device 200. The UWB communication device 200 comprises a UWB communication unit 202 and a radio frequency (RF) communication device 204 which are operatively coupled to each other. The RF communication device 204 is a radio frequency identification (RFID) tag. It is noted that an RFID tag typically comprises a small radio transponder. When triggered by an electromagnetic interrogation pulse from an RFID reader device, the tag transmits data back to the reader device. The UWB communication unit 202 is configured to establish and perform UWB radio communication with an external device (not shown). Furthermore, the RF communication device 204 is configured to receive at least one command from an external reader (not shown) and to initiate a wake-up or a power-up of the UWB communication unit 202 in response to receiving said command. By waking up or powering up the UWB communication unit 202 through the RF communication device 204, a reduction of the power consumption of the UWB communication unit 204 can be achieved. More specifically, the UWB communication unit 204 may be in a sleep mode or be switched off most of time, and it may be woken up or powered up, respectively, only when UWB radio communication with the external device should be carried out. Since the RF communication device 204 is an RFID tag, which does not consume much power and which can be powered by the field, a significant reduction of the power consumption can be achieved. It is noted that the UWB communication unit 202 is also referred to as a UWB subsystem herein. The RF communication device 204 may conveniently be implemented as an ultra-high frequency (UHF) tag. Such tags have a small form factor and can be powered by the field generated by the reader, so that they do not need to be powered by the UWB communication device's own power source.

Figure 3:
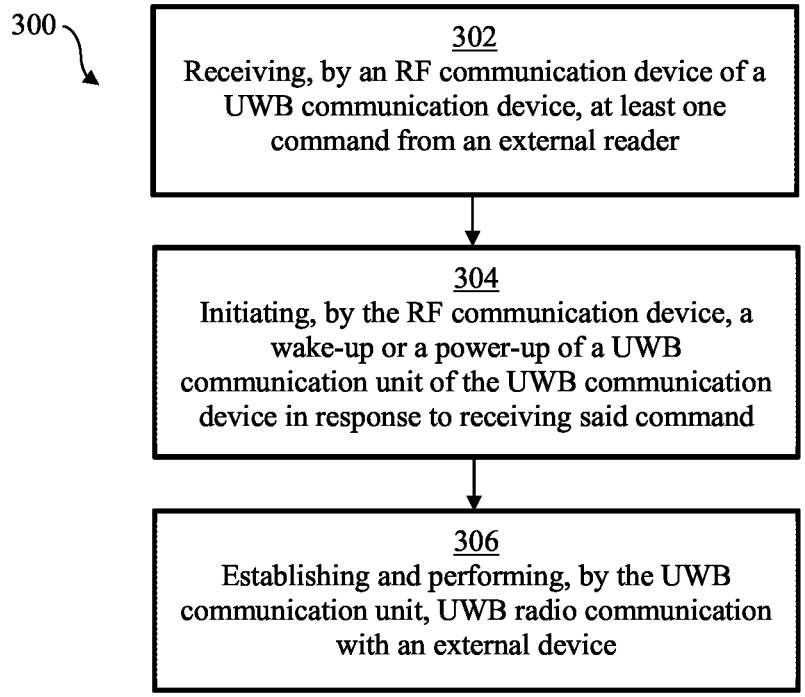
FIG. 3 shows an illustrative embodiment of a method of operating a UWB communication device.

FIG. 3 shows an illustrative embodiment of a method 300 of operating a UWB communication device. The method 300 comprises the following steps. At 302, an RF communication device comprised in a UWB communication device receives at least one command from an external reader. Furthermore, at 304, the RF communication device initiates a wake-up or a power-up of a UWB communication unit of the UWB communication device, in response to receiving said command. Furthermore, at 306, the UWB communication unit establishes and performs UWB radio communication with an external device. As mentioned above, in this way, a reduction of the power consumption of the UWB communication unit can be achieved.

In a practical implementation, the RF communication unit is configured to initiate the wake-up by transmitting a wake-up signal to the UWB communication device. In another practical implementation, the UWB communication device further comprises a power management unit which is configured to provide power to the UWB communication unit, wherein the RF communication device is configured to initiate the power-up by transmitting a power-up signal to the power management unit. In that case, the power management unit may promptly power up the UWB communication unit in response to receiving the power-up signal. It is noted that these implementations are not mutually exclusive, in the sense that the RF communication may in some implementations be configured to wake up the UWB communication device and to power up the UWB communication device. Furthermore, the UWB communication unit and the RF communication device may be coupled to each other through a wired connection. In this way, the aforementioned wake-up signal can easily be transmitted. In addition, as will be explained in more detail below, data such as functional commands may be provided to the UWB communication unit through the RF communication device.

In one or more embodiments, the wake-up signal is stored in the RF communication device, and the UWB communication unit is configured to overwrite said wake-up signal after the wake-up has been performed. In this way, the external reader can trigger a new wake-up by sending another wake-up command to the RF communication device. Furthermore, in one or more embodiments, the UWB communication unit is configured to receive one or more functional commands from the RF communication device. These functional commands may also be transmitted to the RF communication device by the external reader. In this way, the functions performed by the UWB communication unit (e.g., functions relating to ranging operations) can be controlled through the RF communication device instead of using the UWB communication channels for this purpose. Thus, in this way, the functionality of the UWB communication device can be controlled at low power, because the UWB communication unit does not need to exchange control data directly with the external device (e.g., with a supervisory system) through a UWB communication channel. In a practical implementation, the functional commands relate to ranging operations to be performed by the UWB communication unit. Furthermore, in one or more embodiments, the functional commands comprise task scheduling commands. Thereby, the tasks or operations to be performed by the UWB communication unit can easily be scheduled, again at lower power (i.e., without involving the UWB communication unit itself in the task scheduling process). Furthermore, in one or more embodiments, the UWB communication unit is configured to switch itself off after performing one or more predefined functions. In this way, the power consumption can be further reduced.

Thus, in accordance with the present disclosure, a fully passive or semi-passive UHF tag may be used for waking up or powering up a UWB system that is in a sleep mode or switched off, respectively. Furthermore, the UWB system can be controlled by an external supervisory system through said UHF tag. The UHF tag can be controlled over the RF interface by a UHF reader and can also be accessed by the UWB subsystem over a wired connection. The tag has a connection to the UWB subsystem or to the power supply of the UWB subsystem, in order to wake up or power up the UWB subsystem. Furthermore, data can be exchanged through the wired connection between the UHF tag and the UWB subsystem. This wired connection can also be used for scheduling different events on the UWB subsystem, thereby avoiding the use of the UWB communication channels for this purpose. For instance, for saving most of the power the UWB subsystem may only be woken up by the UHF tag for scheduling UWB-specific tasks, which reduces the channel utilization of the UWB subsystem significantly. This, in turn, has the effect that a higher number of UWB tags can be used within the same channel and that the power consumption on the UWB tag side is reduced.

Figure 4:
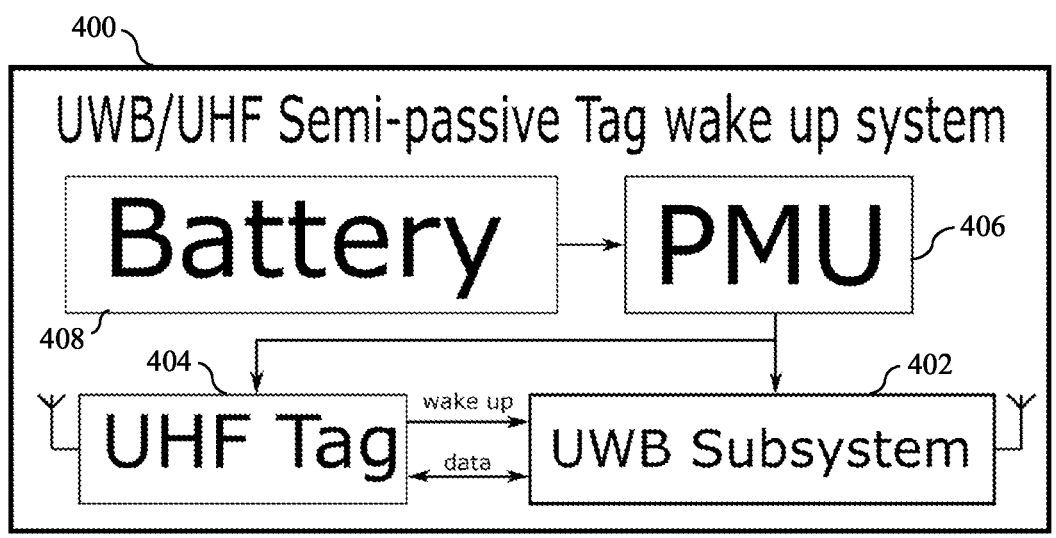
FIG. 4 shows another illustrative embodiment of a UWB communication device.

FIG. 4 shows another illustrative embodiment of a UWB communication device 400. The UWB communication device 400 comprises a UWB subsystem 402, a UHF tag 404, a power management unit 406 and a battery 408. It is noted that a tag may also be referred to as a transponder. In particular, the UWB communication device 400 is a semi-passive UWB communication device, in the sense that a battery 408 is available only for powering the UWB subsystem 402 and that the UHF tag 404 does not need to be powered by said battery 408. In other words, the UHF tag 404 can be powered by the field generated by the external reader.

It is noted that depending on the power requirements of the UWB subsystem 406, the power management unit 406 may not be required and the battery 408 may be coupled directly to the UWB subsystem 402. The semi-passive system in this example has a battery 408 as a power source, which is used for powering the power management unit 406. The power management unit 406 converts the battery voltage to a voltage needed by the UWB subsystem 402. Optionally, the UHF tag 404 may also be powered by the battery 408 via the power management unit 406. If the UHF tag 404 is also powered by the power management unit 406 or directly by the battery 408, the link budget of the UHF tag 404 is increased which results in a larger maximum wake-up distance. However, this link budget increase also results in a higher power consumption of the total system because of the additional power consumed by the UHF tag 404. Compared to the UWB subsystem 402, the powering of the UHF tag 404 will not have a large impact on the total power consumption. Thus, powering the UHF tag 404 using a power source of the device 400 may be acceptable, depending on the desired maximum wake-up distance and the maximum power consumption of the system.

A semi-passive wake up system has the advantage that the UWB subsystem 402 can be woken quickly, because the UWB subsystem 402 is only in a sleep mode, which means that most of the components within the system do not need to be reinitialized. A wake-up can be triggered by the UHF tag 404 if the UHF tag 404 receives, for example, a wake-up command from the external reader. In that case, the UHF tag 404 may raise an interrupt on the UWB subsystem 402. By providing a data link between the UWB subsystem 402 and the UHF tag 404, the UHF interface can also be used a low-power or passive data interface, depending on the required data rate. Once the UWB subsystem 402 is woken up, one of more functions or tasks can be performed, for example in response to specific functional commands received through the UHF tag 404. After having performed those functions or tasks, the UWB subsystem 402 can enter into the sleep mode again. Furthermore, the UWB subsystem 402 may overwrite the wake-up signal stored in the memory of the UHF tag 404. In this way, the UHF reader can wake up the UWB subsystem 402 again, in particular by retriggering the UHF-based wake-up using the aforementioned wake-up command. Accordingly, a UHF reader may be integrated in a central localization system and said UHF reader may fully control the duty cycling ratio of the UWB subsystem 402 by merely sending wake-up commands.

In response to different functional commands, different functions or tasks can be performed by the UWB subsystem 402. Furthermore, these functions or tasks can be scheduled in accordance with specific task scheduling commands received through the UHF tag 404. In addition, through the data link between the UWB subsystem 402 and the UHF tag 404, the RF on-time of the UWB subsystem 402 can be reduced, because functional commands and control data such as task scheduling commands can be transmitted through the UHF tag 404 instead of through a UWB communication channel. Accordingly, the required UWB channel capacity may also be reduced and the amount of UWB communication devices (i.e., UWB tags) that can be used within a localization system can be increased. By defining proper guard times between the UHF wake-ups of the different UWB tags, it may be ensured that no collisions on the UWB channel occur. By designing a proper command set a UWB localization system that comprises a UHF reader may have full control of the behavior of the UWB tags, which allows for an easy and centralized system administration. Such a system can also be extended with other functionality that can be triggered through the UHF tag 404.

Figure 5:
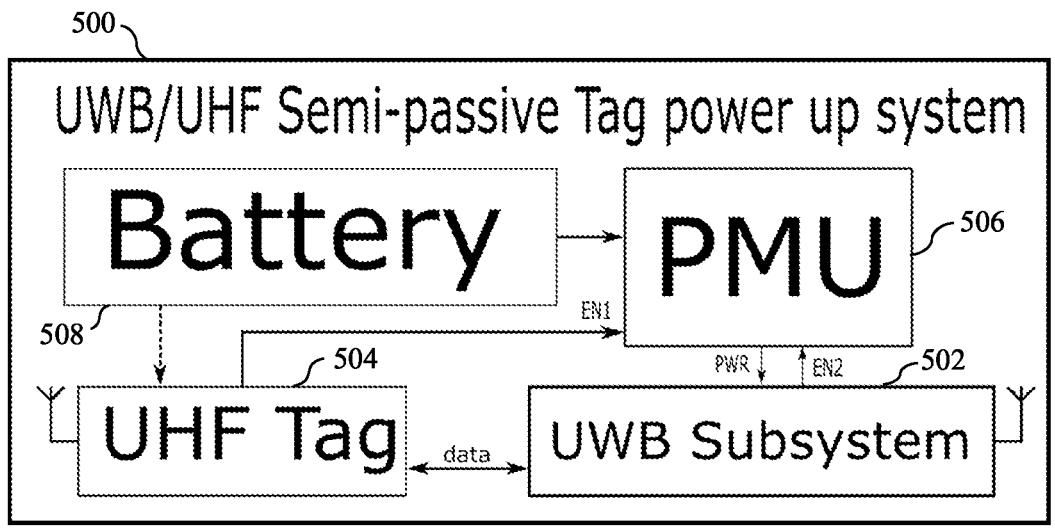
FIG. 5 shows a further illustrative embodiment of a UWB communication device.

FIG. 5 shows a further illustrative embodiment of a UWB communication device 500. The UWB communication device 500 comprises a UWB subsystem 502, a UHF tag 504, a power management unit 506 and a battery 508. In this embodiment, the UWB subsystem 502 is not woken up from a sleep mode, but it is powered up after having been switched off. For example, the power management unit 506 may power up the UWB subsystem 502 in response to receiving a power-up signal from the UHF tag 504. Alternatively, if no power management unit 506 is present and the UWB subsystem 502 is powered directly by the battery 508, at least a switch should be added for switching the system off. The implementation of the power switching can be system-dependent. Depending on the required maximum power-up distance of the UHF tag 504 and the overall system power consumption, the UHF tag 504 can also be powered by the battery 508 or by an additional low-power power management unit (not shown).

When the UHF tag 504 receives a command from the reader for switching on the power management unit 506, the power management unit 506 powers up the UWB subsystem 502. In particular, the power management unit 506 powers up the UWB subsystem 502 until the UWB subsystem 502 switches off the power management unit 506. More specifically, when the UWB subsystem 502 is powered up once, the power supply needs to stay switched on such that the UWB subsystem 502 can execute the tasks defined by the UHF reader for transmitting UWB frames and for being localized. How the power supply is implemented may be system-dependent. Since there is a data link between the UHF tag 504 and the UWB subsystem 502, the UHF tag 504 can also be used as a very low-power interface between the UHF reader and the UWB communication device 500 (i.e., the UWB tag). For example, the UWB subsystem 502 can store data in the memory of the UHF tag 504, which can be fetched later by the UHF reader.

The principle of using the UHF tag 504 for the data transmission in the UWB power-up system may be the same as for the wake-up system shown in FIG. 4. For both systems, the required power supply for writing data from the UWB subsystem 502 to the UHF tag 504 should be considered. In this implementation, when the UWB communication has been completed, the UWB subsystem 502 can switch off itself by resetting the power enable (EN1) line from the UHF tag 504 and by resetting the power-on state of the power management unit (EN2). Thus, when the UWB subsystem 502 is switched off again, the UWB communication device 500 does not consume more power than the power lost by leakage within the power management unit 506. If the UHF tag 504 is also powered by the battery 508 (as indicated by the dotted line in FIG. 5), the power consumption equals the sum of the power consumed by the UHF tag 504 and the power lost by leakage within the power management unit 506.

Figure 6:
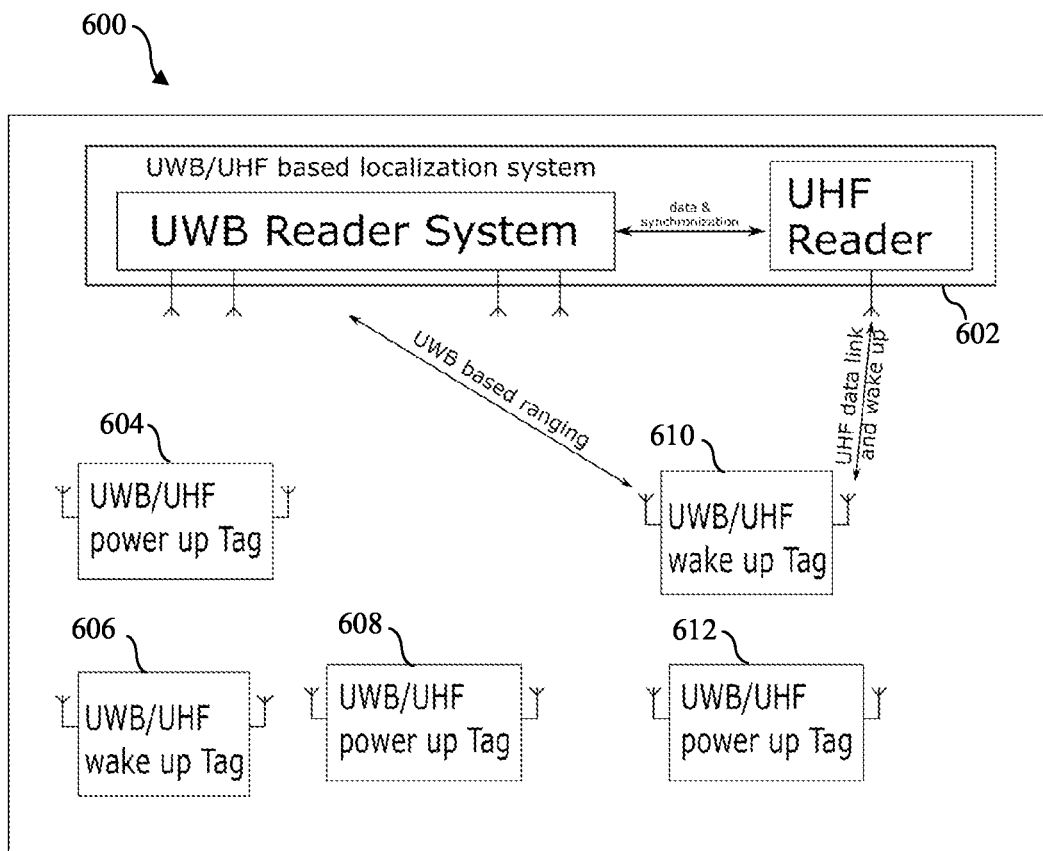
FIG. 6 shows an illustrative embodiment of a localization system.

FIG. 6 shows an illustrative embodiment of a localization system 600. The localization system 600 comprises a central UWB/UHF based localization system 602 (e.g., a supervisory system) and a plurality of UWB communication devices 602, 604, 606, 608, 610, 612 of the kind set forth. In this example, some of the UWB communication devices are referred to as UWB/UHF wake-up tags 606, 610 because they are woken up from a sleep mode, while other UWB communication devices are referred to as UWB/UHF power-up tags 604, 608, 612 because they are fully powered up. The host system 602 responsible for executing the localization comprises a UHF reader that is connected to a UWB reader system. The architecture of the localization system may depend on the system requirements. For the sake of simplicity, the localization system is controlled by the UWB reader system in this example. Every time when a UWB communication device (i.e., a UWB/UHF tag) should be localized by the UWB reader system, the UWB reader system transmits a request to the UHF reader for waking up a UWB/UHF tag with a dedicated task written into the UHF tag comprised in said UWB/UHF tag. Subsequently, the UWB subsystem of said UWB/UHF tag is woken up or powered up and executes the received task, which enables the localization of the UWB/UHF tag. When the UWB subsystem is powered up instead of woken up, more time may be needed for executing the localization process.

Figure 7:
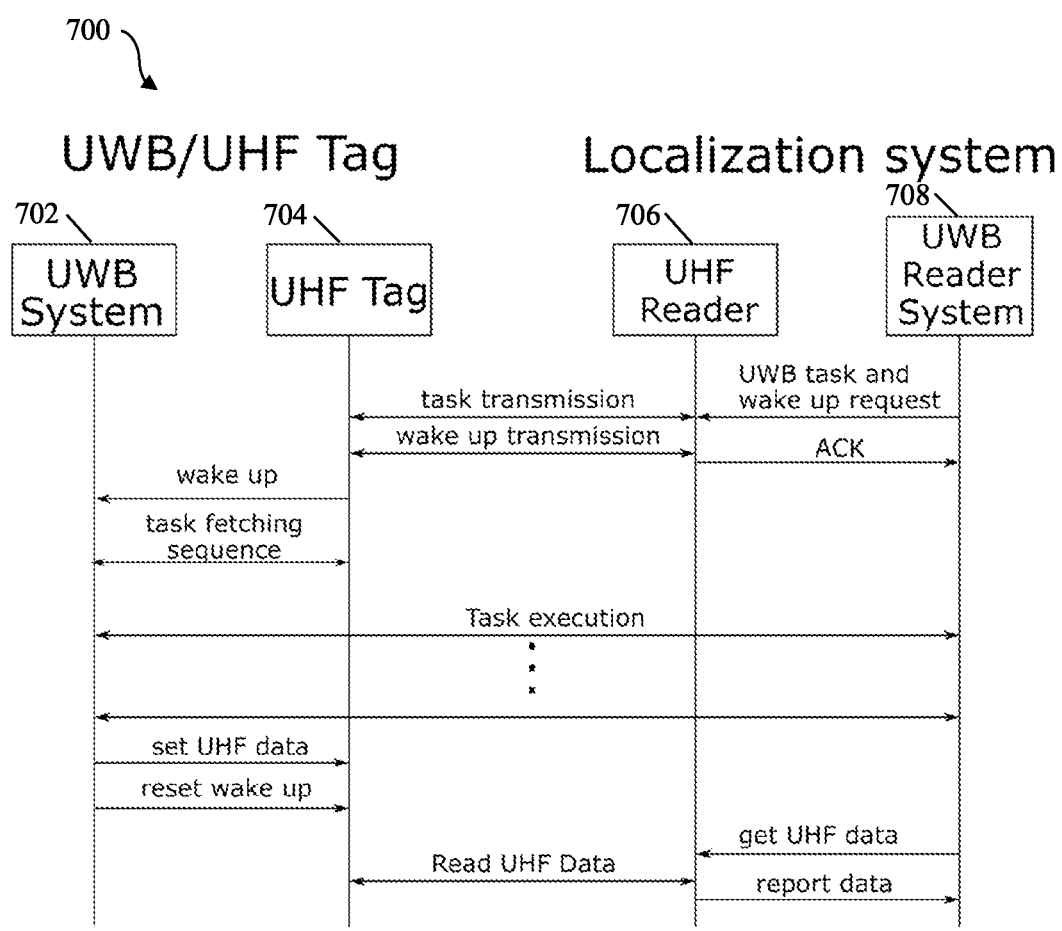
FIG. 7 shows an illustrative embodiment of a communication sequence.

FIG. 7 shows an illustrative embodiment of a communication sequence 700. In particular, FIG. 7 shows an embodiment of a communication sequence 700 of a UWB/UHF system of the kind set forth, which is controlled by a UWB reader system 708. When a UWB communication device (i.e., a UWB/UHF tag) should be localized, the UWB reader system 708 sends a wake-up request with a task command to the UHF reader 706. In this example, the UWB reader system 708 executes the localization application, which means that a request for performing a UWB-based localization only needs to be sent to the UHF reader 706. Alternatively, a host controller which executes the localization application may have to send the localization task and wake up the UHF reader 706 in order to transmit commands to the UHF tag 704. When the UHF reader 706 receives the request from the UWB reader system 708, it processes the request and transmits a wake-up signal and task data to the UHF tag 704. If the UHF tag 704 receives the wake-up command successfully, it responds with an acknowledge message. The UHF reader 706 reports this acknowledgement to the UWB reader system 708, so that the latter can turn on the UWB RF interface. When the UWB subsystem 702 has been woken up, the UWB subsystem 702 starts a UWB-based ranging session with the UWB reader system 708. Depending on the amount of the time spent by the UWB/UHF tag between receiving the wake-up command from the UHF reader 706 and the execution of the UWB-related task, a delay may be introduced for booting up the UWB readers. Furthermore, the UHF interface can be used for transmitting data (e.g., RF configuration data) from the reader system 708 to the UHF tag 704. These data can be written into the memory of the UHF tag 704. The UWB subsystem 702 can be informed about these data either by adding an additional "data available" line between the UHF tag 704 and the UWB subsystem 702 or by checking a "data available" register via the data link every time when the UWB subsystem 702 is woken up. After the ranging operation has finished the UWB subsystem 702 can write to the UHF tag 704, e.g. to exchange data with the UWB reader system 708 at low power. When the UWB subsystem 702 has finished all its tasks it may reset the wake-up line from the UHF tag 704 and return to a sleep state or power-down state. The UHF reader 706 can fetch the data later without a need for powering the UWB subsystem 702.

It is noted that the commands and requests shown in FIG. 7 merely represent examples, which illustrate a possible inter-system communication. Depending on the application that should be realized, either default UHF commands or proprietary commands should be designed for serving the application. Using an out-of-band task scheduler in accordance with the present disclosure has the advantage that the computational effort and the power consumption can be shifted from one system to another. Especially in systems in which the UWB channel utilization is important, an out-of-band communication channel that takes over the communication required for the task scheduling and administration can result in a better system scalability. By defining a proper command set that can be transmitted over the UHF channel and later executed by the UWB system, a good system flexibility can be achieved since the system application executed by the UWB/UHF tag can be defined on the reader side without a need for reprogramming the UWB/UHF tag. This allows also for a good system maintainability, because a software update only needs to be performed on the UHF/UWB reader system instead of all the UHF/UWB tags. Furthermore, by creating a wake-up or power-up sequence that has an accurate timing, the full UWB channel can be used for the actual task execution instead of using a part of the bandwidth for the data exchange required for the inter-system synchronization.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 localization system
102 UWB supervising system
104 UWB tag
106 UWB tag
108 UWB tag
110 UWB tag
112 UWB tag
200 UWB communication device
202 UWB communication unit
204 RF communication device
300 method of operating a UWB communication device
302 receiving, by an RF communication device of a UWB communication device, at least one command from an external reader
304 initiating, by the RF communication device, a wake-up or a power-up of a UWB communication unit of the UWB communication device in response to receiving said command
306 establishing and performing, by the UWB communication unit, UWB radio communication with an external device
400 UWB communication device
402 UWB subsystem
404 UHF tag
406 power management unit
408 battery
500 UWB communication device
502 UWB subsystem
504 UHF tag
506 power management unit
508 battery
600 localization system
602 UWB/UHF based localization system
604 UWB/UHF power-up tag
606 UWB/UHF wake-up tag
608 UWB/UHF power-up tag
610 UWB/UHF wake-up tag
612 UWB/UHF power-up tag
700 communication sequence
702 UWB system
704 UHF tag
706 UHF reader
708 UWB reader system

The invention claimed is:

1. An ultra-wideband, UWB, communication device, comprising:
a UWB communication unit to establish and perform UWB radio communication with an external device;
a radio frequency, RF, communication device being a radio frequency identification, RFID, tag;
wherein the RF communication device receives at least one command from an external reader and to initiate a wake-up of the UWB communication unit in response to receiving said command; and wherein the RF communication device initiates said wake-up by transmitting a wake-up signal, which is stored in the RF communication device, to the UWB communication unit, wherein the UWB communication unit establishes and performs the UWB radio communication with the external device once the UWB communication unit receives the wake-up signal, and wherein a delay is introduced for booting up the external device depending on an amount of time spent by the UWB communication unit receiving the wake-up signal.

2. The UWB communication device of claim 1, wherein the RFID tag is an ultra-high frequency, UHF, tag.

3. The UWB communication device of claim 1, further comprising a power management unit which provides power to the UWB communication unit, wherein the RF communication device initiates a power-up by transmitting a power-up signal to said power management unit.

4. The UWB communication device of claim 1, wherein the UWB communication unit and the RF communication device are coupled to each other through a wired connection.

5. The UWB communication device of claim 1, wherein the UWB communication unit overwrites said wake-up signal after the wake-up has been performed.

6. The UWB communication device of claim 1, wherein the UWB communication unit receives one or more functional commands from the RF communication device.

7. The UWB communication device of claim 6, wherein the functional commands relate to ranging operations to be performed by the UWB communication unit.

8. The UWB communication device of claim 6, wherein the functional commands comprise task scheduling commands.

9. The UWB communication device of claim 1, wherein the UWB communication unit switches itself off after performing one or more predefined functions.

10. A localization system comprising the UWB communication device of claim 1 and said external reader.

11. The localization system of claim 10, wherein said external reader transmits one or more functional commands to the RF communication device.

12. The UWB communication device of claim 1, wherein the RF communication device stores data from the UWB communication unit; and
wherein the external reader fetches the data from the RF communication device without powering the UWB communication unit.

13. A method of operating an ultra-wideband, UWB, communication device, comprising:
receiving, by a radio frequency, RF, communication device comprised in the UWB communication device, at least one command from an external reader, wherein said RF communication device is a radio frequency identification, RFID, tag;
initiating, by the RF communication device, a wake-up of a UWB communication unit comprised in the UWB communication device in response to receiving said command, and wherein initiating said wake-up includes:
transmitting, by the RF communication device, a wake-up signal to the UWB communication unit, wherein the wake-up signal is stored in the RF communication device;
establishing and performing, by the UWB communication unit, UWB radio communication with an external device, wherein the UWB communication unit establishes and performs the UWB radio communication with the external device once the UWB communication unit receives the wake-up signal, and wherein a delay is introduced for booting up the external device depending on an amount of time spent by the UWB communication unit receiving the wake-up signal.

14. The method of claim 13, wherein the RFID tag is an ultra-high frequency, UHF, tag.

15. The method of claim 13, wherein the UWB communication device further comprises a power management unit which provides power to the UWB communication unit, and wherein the RF communication device initiates a power-up by transmitting a power-up signal to said power management unit.

16. The method of claim 13, wherein the UWB communication unit and the RF communication device are coupled to each other through a wired connection.

17. The method of claim 13, wherein the UWB communication unit overwrites said wake-up signal after the wake-up has been performed.

18. The method of claim 13, wherein the UWB communication unit receives one or more functional commands from the RF communication device.

19. The method of claim 18, wherein the functional commands relate to ranging operations to be performed by the UWB communication unit.

* * * * *